United States Patent [19]

Lumsden

[11] Patent Number: 5,753,100
[45] Date of Patent: May 19, 1998

[54] IONIZATION-TYPE WATER PURIFICATION SYSTEM

[76] Inventor: Dennis L. Lumsden, 835 N. Pointe, Port Huron, Mich. 48060

[21] Appl. No.: 774,950

[22] Filed: Dec. 27, 1996

[51] Int. Cl.⁶ .................................................... C02F 1/461
[52] U.S. Cl. .................. 205/701; 205/742; 204/272; 204/275
[58] Field of Search .................................. 205/701, 742; 204/272, 275

[56] References Cited

U.S. PATENT DOCUMENTS

| | | |
|---|---|---|
| 3,425,925 | 2/1969 | Fleischman . |
| 3,514,389 | 5/1970 | Stephan et al. . |
| 4,119,518 | 10/1978 | Miller .......................... 204/272 |
| 4,269,690 | 5/1981 | Graham, III . |
| 4,341,617 | 7/1982 | King . |
| 4,439,300 | 3/1984 | Houseman ..................... 204/272 |
| 4,525,253 | 6/1985 | Hayes et al. ................... 204/149 |
| 4,525,272 | 6/1985 | Henson . |
| 4,680,114 | 7/1987 | Hayes . |
| 4,719,018 | 1/1988 | Przybylski . |
| 4,822,472 | 4/1989 | Reis et al. . |
| 4,936,979 | 6/1990 | Brown . |
| 5,085,753 | 2/1992 | Sherman ........................ 204/271 |
| 5,088,432 | 2/1992 | Usami et al. . |
| 5,094,739 | 3/1992 | Kump ............................ 204/197 |
| 5,102,515 | 4/1992 | Ibbott . |
| 5,114,571 | 5/1992 | Pier et al. . |
| 5,364,512 | 11/1994 | Earl . |
| 5,543,040 | 8/1996 | Fite, Jr. et al. ................ 210/167 |

FOREIGN PATENT DOCUMENTS

| | | |
|---|---|---|
| 0284367 | 9/1988 | European Pat. Off. . |
| 8707251 | 12/1987 | WIPO . |
| 9420420 | 9/1994 | WIPO . |
| 9618579 | 6/1996 | WIPO . |

*Primary Examiner*—Arun S. Phasge
*Attorney, Agent, or Firm*—Brooks & Kushman P.C.

[57] ABSTRACT

An ionization delivery unit suitable for introducing microbicidal metal ions into an aqueous fluid comprises an inner cylindrical electrode surrounded by a cylindrical outer electrode disposed to provide a flow path generally shaped as a hollow cylinder, aqueous fluid introduced into the flow path by an inlet which imparts a substantial tangential component to the fluid flow. The vortexing flow encourages even electrode wear and minimizes deposition of occluding substances on the electrodes. The inner electrode is preferably a copper/silver anode while the outer electrode is preferably a stainless steel.

19 Claims, 3 Drawing Sheets

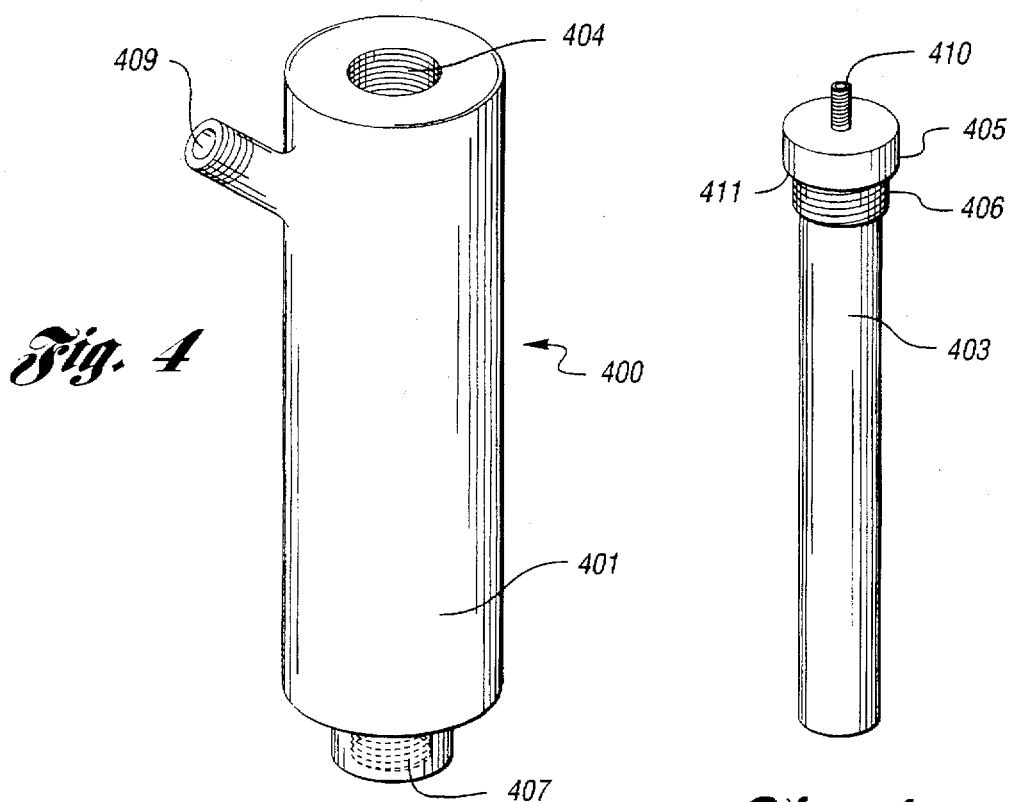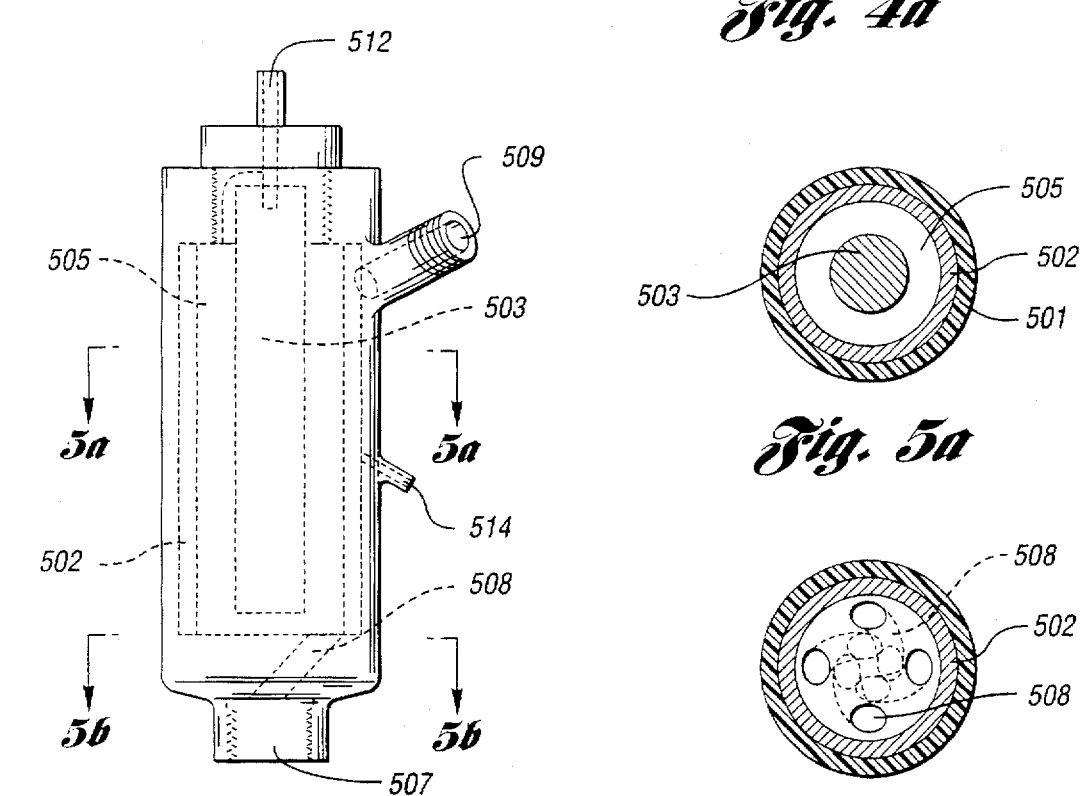

IONIZATION-TYPE WATER PURIFICATION SYSTEM

TECHNOLOGICAL FIELD

The present invention pertains to ionization-type water purification systems whereby an anode consisting of a copper and silver alloy, optionally containing other metals as well, is biased by a voltage sufficient to cause the production of silver ions and cupric ions in water flowing through the system.

DESCRIPTION OF THE RELATED ART

Ionization-type water purification systems have been proposed for numerous years. Among the applications proposed are the purification of swimming pool water, i.e. enabling the water to be kept free of algae and bacteria; purification of water cooling systems for commercial heating and cooling systems, for example in treating cooling water in rooftop units where bacteria corresponding to "Legionnaires disease" and other bacteria varieties may breed; and industrial systems, for example those involved with cathodic electrolytic paint deposition systems which must also be kept free of algae and bacterial growth. Unfortunately, while ionization systems have been proposed for numerous years, their commercial applicability has been limited. For example, in home swimming pools, the cost of suitable ionization units together with its electrical power requirements, the cost of replacing relatively expensive silver/copper electrodes, and the necessity for occasional maintenance which ordinarily cannot be provided by the home owner, has limited the use of such systems. The overall cost of such systems are not, in general, cost competitive with the use of conventional chlorine-containing chemicals, particularly when the heavy up front investment for the system is kept in mind.

In the case of cooling systems for commercial buildings, it is only relatively recently that such systems have been discovered to be active breeding sites for harmful bacteria such as those which cause Legionnaires disease. As a result of these discoveries, many communities require frequent cleaning and inspection of rooftop cooling devices. However, periodic sterilization rather than preventative measures have dominated thus far. Thus, it is only in the industrial sector where use of ionization-type water purification systems have met with any degree of success, and even in these situations, there are many problems associated with such systems.

For example, in the painting of automobiles and other components, water curtains are often used to trap paint overspray so as to prevent the paint overspray products from escaping into the atmosphere or into the sanitary sewer. In order to be commercially feasible, the water utilized in the water curtains must be continually reused, and thus it is recirculated from large tanks. Over the passage of time, growth of algae, bacteria, and other microorganisms would create an unsanitary condition, and also would require replacement of water which has not yet reached its full capacity for absorption of paint solids.

In U.S. Pat. No. 5,543,040, it is suggested that the water in such systems be purified by pumping the water through an ionization-type device having an anode consisting of a silver/copper alloy, and two stainless steel cathodes straddling the anode. A direct voltage of approximately 50 volts is applied across the electrodes, and the copper/silver electrode gradually dissolves under the applied polarity, introducing silver and copper ions into solution. As illustrated by U.S. Pat. No. 4,525,253, the use of both silver and copper ions produces a synergistic effect in purifying water, the effect of concentrations of these ions together being far greater than the concentrations of either ion alone.

In order to prevent paint solids from adhering to the electrodes of the system of U.S. Pat. No. 5,543,040, the voltage applied to the electrodes is occasionally disrupted or even reversed, as disclosed in U.S. Pat. No. 4,936,979. During such periods, the liquid flow through the device is rapid enough so as to remove paint particles and other impurities which might otherwise occlude the surface of the electrodes, thereby decreasing the efficiency of the unit. However, despite these precautions, and despite the use of stainless steel cathodes rather than twin silver/copper alloy electrodes as disclosed in U.S. Pat. No. 4,525,253, it is still necessary that the housing of the device of U.S. Pat. No. 5,543,040 be made transparent in order that frequent inspection of the electrodes may occur, and that the electrodes be mounted in such a manner so as to be readily removable from the system so that they may be cleaned at frequent intervals. In addition to these drawbacks, it has been found that the electrode wear in those such systems is not uniform. Thus, the electrode may have to be replaced at more frequent intervals, as the uneven wearing decreases the efficiency of the unit as well as allowing for electrode disintegration to introduce particles of silver/copper alloy into the recirculating system which may then damage the pump or other components.

The problems of uneven electrode wear has not gone unrecognized. In U.S. Pat. No. 4,525,272, a central electrode of a copper silver alloy is surrounded by a galvanized iron wire cage which serves as the cathode. However, the electric field and voltage gradients produced in the liquid by such a device are still not uniform, as the wire portions of the cage represent concentration points prohibiting a uniform electric field. Moreover, due to the open nature of the enclosing screen, the surface area of the cathode is extremely limited. Finally, water flow through the device is haphazard, and produces a flow path which is roughly downward along one side of the central electrode and upward along the backside of this electrode, thus producing not only uneven wear as between these two surfaces, but also causing uneven wear as between these surfaces and the sidemost surface.

In U.S. Pat. No. 5,364,512, a unit of higher efficiency than that disclosed in U.S. Pat. No. 4,525,272 is claimed, wherein the cage-like electrode is replaced by an outwardly surrounding electrode, which may be cylindrical, in conjunction with laminar flow through the device. In the preferred embodiment, the central electrode is substantially star shaped, and the outermost electrodes are rectangular bars whose protruding edges, when viewed in cross-section, are directed into the spaces between the star points of the central electrode. In the device of U.S. Pat. No. 5,364,512, greater efficiency is obtained, but wear on the electrodes is purposefully made uneven in the preferred embodiment due to the electrode configurations. Furthermore, the electrodes of this device will be subject to occlusion by particles in the liquid to be treated, and cannot be easily removed for cleaning purposes.

It would be desirable to provide an ionization-type water purification system which is efficient, which promotes even electrode wear, and which substantially minimizes the occlusion of electrodes by deposition of particles from the liquid being treated. It would be further desirable to provide such a system which is robust, which does not require frequent replacement of components, and wherein electrode inspection and replacement, when necessary, is rendered easy.

SUMMARY OF THE INVENTION

The present invention pertains to an ionization-type water purification system employing a central copper/silver alloy anode substantially surrounded by a cylindrical cathode which may be of stainless steel or other metal, the spacing between the central anode and surrounding cathode defining a flow channel through which aqueous fluid to be purified is directed, the fluid directed in such a manner so as to have a substantial circumferentially tangential component, the vortex created by this tangential component combined with the flow rate of the fluid sufficient to encourage even electrode wear, and to minimize deposition of occluding matter onto the electrodes.

BRIEF DESCRIPTION OF THE DRAWINGS

FIG. 4 illustrates an injection molded vortexing electrode device.

FIG. 4a illustrates an anode useful with the device of FIG. 4.

FIG. 5 is a view through the device of FIG. 4.

FIGS. 5a and 5b illustrate the construction of the device of FIGS. 4 and 5 across 5a–5a and 5b–5b.

DESCRIPTION OF THE PREFERRED EMBODIMENTS

Figure 1:
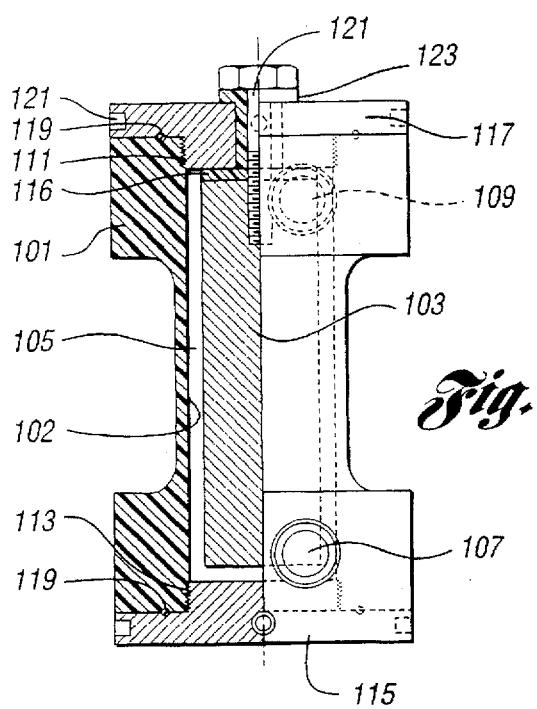
FIG. 1 illustrates one embodiment of a vortexing electrode device of the subject invention.

The operation of ionization-type water purification systems, and the power supplies and other electrical control systems associated therewith are by now well known to those skilled in the art. Reference may be had for example to U.S. Pat. Nos. 4,680,114; 4,719,018; 5,543,040; and PCT published application Wo 94/20420 in this regard, which are herein incorporated by reference. In the most basic sense, the system comprises at least one anode composed of a metal or metal alloy which under the influence of an applied direct current voltage, releases metal ions into an aqueous liquid flowing past the electrode, the concentration of ions released being sufficient to eliminate or reduce the concentration of offending microorganisms, including but not limited to algae and bacteria. The system also contains a metal cathode which may be of the same or a different metal, but in the present case is preferred to be stainless steel. In operation, direct current is supplied across the cathode and anode while the fluid to be purified flows past the electrodes. Ionization is continued until the level of ions in the system is sufficient to retard the microorganism growth. To encourage dissolution, or to aid in the cleaning of electrodes, it is common that the direct current applied to the electrodes be occasionally reduced to zero, or even reversed. In order to do this, it is common to use sinusoidal or square wave generators as disclosed in the previously identified patents.

The central, ion-generating electrode is preferably a copper/silver alloy containing from about 60 to about 90% copper and from about 10 to about 40% silver. However, alloys containing greater or less quantities of copper and/or silver are suitable as well, as are electrodes which are capable of generating other microbicidal amounts of other metal ions, for example those of nickel, gold, manganese, zinc, and the like. In addition, alloys which comprise copper and silver in major part, together with traces of other metals such as nickel, tin, lead, and the like, may also be used. Preferably, however, the central anode is a copper/silver alloy containing approximately 71% copper and 29% silver. The central anode is cylindrical in shape. For example, the anode may comprise a solid cylinder, or "rod" of appropriate metal, or may be a hollow cylinder. For devices where it is desirable that the anode have a substantial diameter, it may be desirable to shrink-fit a hollow cylinder of the appropriate anode metal onto an inner metal or polymer cylindrical support.

The surrounding cylindrical electrode may be constructed of stainless steel, or other metals as desired. Preferably, the material is stainless steel, i.e. type 304, type 308, type 316, or other relatively corrosion resistant stainless steel. Preferably, the stainless steel electrode is highly polished in order to present a smooth, occlusion-resistant surface. It is also possible, and even preferable in some cases as defined hereafter, to employ the same or a similar copper/silver alloy for the cylindrical cathode as is used for the central anode. In such cases, the current may be periodically reversed so as to be helpful in eliminating occlusion from the surfaces of the respective cathodes while yet still generating copper and silver ions into solution. The term "cylindrical", as used with respect to the cathode implies "hollow cylindrical", as it is recognized that the anode must be located within the cathode and that a "cylindrical", in reality a "hollow cylindrical" flow path is established therebetween.

By the term "substantially surrounding" as it refers to the cylindrical cathode, is meant that the cylindrical cathode should preferably be an uninterrupted cylinder, for example a metal tube having open or closed ends as desired, rather than a cylindrical member whose sides are interrupted by holes, slots, and the like. While such interruptions are permissible, they are not preferred, as their presence decreases the overall efficiency of the unit, provides, at least in some cases, nooks and crannies where solids build-up may occur, and renders manufacture generally more difficult. However, it would not depart from the spirit of the invention to employ, for example, a stainless steel cylinder having had a slot cut along one side thereof parallel with the axis of the cylinder. Such a cylinder is still substantially cylindrical as is meant by that term herein. Likewise, a stainless steel mesh of relatively small mesh size, while not as desirable as a stainless steel tube, could be used without departing from the spirit of the invention. However, the cathode interior surface is free of charge-concentrating projections which may cause flocculation of solids, which decrease fluid flow, which break up the vortexing flow, and which promote uneven electrode wear. The surface area of the metal portions of the cylindrical cathode should ideally comprise in excess of 50 percent of the total geometric area, preferably greater than 80%, and most preferably 95 to 100 percent, i.e. be an uninterrupted cylinder.

The anode should be positioned substantially concentric with the axis of the cylindrical cathode. Exact centering in this regard is not critical, as an electrode which is biased to one side or other of the cylinder would wear initially more rapidly on that side, following which the wear would be more uniform. The separation of the anode from the cathode is also not overly critical, and may range from as little as ⅛ of an inch (3 mm) to over 2 inches (5.1 cm). More preferably, the spacing is between 3/16 inch (4.8 mm) to 3/4 inches (1.9 cm) and most preferably from about 1/4 inch (6.4 mm) to 1/2 inch (12.5 mm). The actual spacing is selected with a view towards the number of liters per minute of fluid which is being treated, the power of the circulating pump, and other factors. The efficiency of the ion generation and therefore the water purification generally lessens as the distance between the electrodes increases. Therefore, it is preferable that smaller spacings, i.e. from 3/16 inch to 1/2 inch be used whenever possible. If this spacing does not allow enough cross-sectional area for the appropriate volumetric flow, then multiple units may be operated in parallel, or alternatively, the diameter of the central electrode may be made much larger, and the cylindrical cathode correspondingly so, in order that a larger volume of fluid may be processed. However, the easiest method of increasing ion generation is to increase the applied voltage which, with a given device of fixed geometry, causes an increase in the number of ions generated. The length of the electrodes is also not critical. However, for most economical use of electrode materials, the lengths of the anode and cathode should be substantially the same. The lengths of the electrodes may also be increased so as to provide a greater surface area and therefore a higher level of ion generating activity, without substantially effecting fluid flow. Units with an electrode length of approximately 6 inches (15 cm) have been found to be eminently suitable for this process.

The fluid traversing the device must have a substantial tangential component so as to provide a swirling type of turbulence, or "vortex". The required vortexing action is achieved by introducing the fluid into the concentric space between the electrodes at an angle which provides a significant circumferential component to the fluid flow. For example, the introduction and withdrawal of fluid may through input and output channels whose flow direction is tangential to the cylinder circumference and either perpendicular or at an angle to the axis of the cylinder.

Alternatively, the fluid entry may be from a direction parallel to the cylindrical axis, but diverted radially such that a circumferential component is present; or may be diverted through one or more series of vane type units which again impart a significant circumferential pattern such that the water swirls about the space between the two electrodes prior to its exit from the device. The construction of the device according to the subject invention may be varied so as to suit the application. For example, a robust and simply machined device may be constructed of stainless steel as shown in FIG. 1 with the fluid inlets and outlets substantially tangential to the circumference of the cylindrical electrode, but orthogonal to a plane passing through the cylindrical axis.

With respect to FIG. 1, the body 101 of the device is a type 304 stainless steel manufacture which may be forged to the approximate shape or machined from a single rod or billet to contain inside cylindrical surface 102 which serves as the cylindrical cathode. At 103 is the copper/silver cylindrical anode, a solid cylinder between which and the interior surface 102 of the cathode lies flow channel 105. The water inlet 107 is directed perpendicular to the cylindrical axis but tangential to the flow channel circumference, such that a swirling, vortexing, turbulent flow is created. The exit passage is not as critical in this regard, and may be axially located or, as shown at 109 in FIG. 1, also positioned in a circumferentially tangential position so as to encourage the vortexing flow. The interior of the ends of body 101 are threaded at 111 and 113 so as to receive correspondingly threaded covers or end plates 115 and 117. Other sealing methods, or fully machined, solid end plates may be used where practical. At 119 are O-ring seals, while at 121 are spanner holes for removal and inspection purposes. Electrode 103 is connected physically and electrically by stud 121 which passes through insulating sleeve 123 which may be of high density polyethylene, Teflon™ PTFE, nylon, or other insulative polymer or other insulative substance. Insulating washer 116 serves to insulate the top of the anode from end plate 117, and may also be made of thermoplastic. The cathode is connected to the electrical supply by a conventional terminal or the like.

Figure 2:
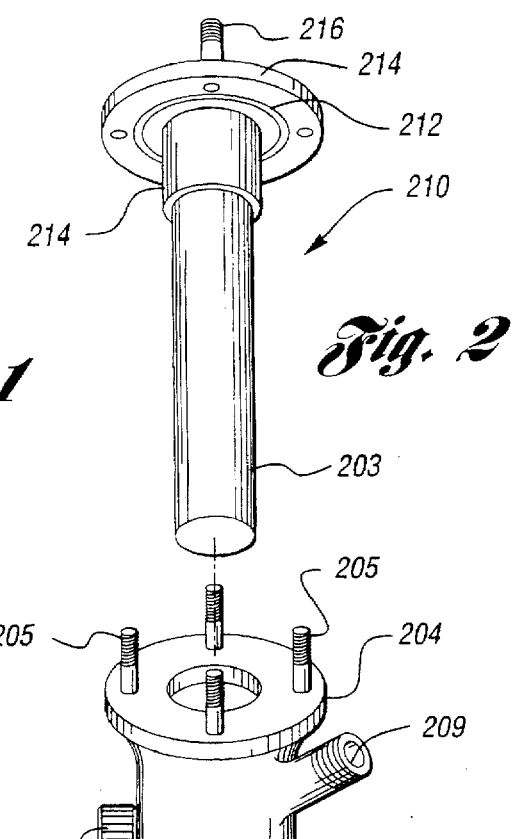
FIG. 2 illustrates a further embodiment of a vortexing electrode device having axially angled inlet and outlet and plastic encapsulated electrode cover.

FIG. 2 shows an alternative embodiment of a stainless steel housing 202 suitable to receive an ion generating anode. Shown at the top of the device is a flange 204 to which are attached four mounting bolts 205. The side of the device is a terminal 206 for electrical connection to the DC poser supply. The water inlet 207 and water outlet 209 are arranged not only tangential to the circumference of the cylinder, but also at an angle to the cylindrical axis to facilitate vortexing with minimal energy loss. While this device has certain advantages with respect to fluid flow, it requires more complex machining and/or welding of the inlets and outlets to the main body. An electrode assembly suitable for use in the housing of FIG. 2 is shown at 210. In this case, the electrode assembly other than the electrode 203 itself is made up of a malleable plastic such as a high strength polyethylene or polypropylene with a built-in knife edged sealing ring 212. The electrode will be inserted into the housing 202, and stainless steel or other nuts supplied to the mounting bolts 205 to secure the device. As the top portion 214 is made of plastic, no special insulating means need be applied. Exiting from the top of the device is a terminal 216 -or connection of the anode to the power supply. For higher pressures, a stainless steel top electrically isolated from either the housing and/or the anode may be manufactured, electrical isolation provided through non-conductive polymer spacers, elastomeric gaskets, and the like.

Figure 3:
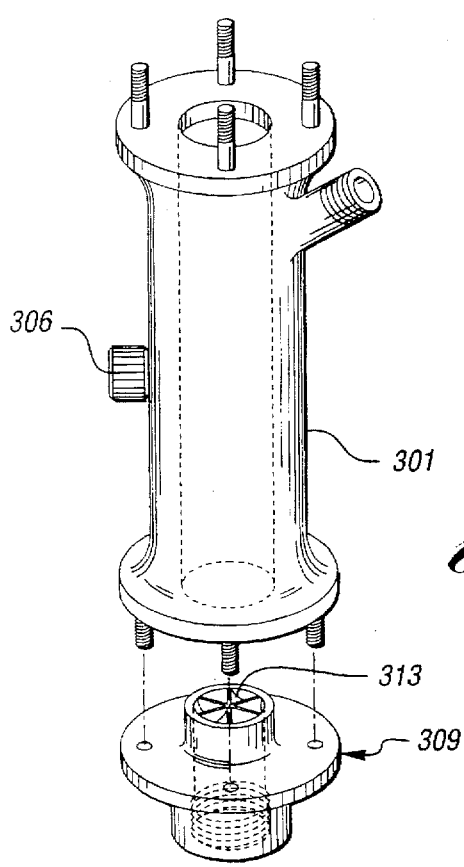
FIG. 3 illustrates a further embodiment of a vortexing electrode device with vane-type vortexing inlet.
Figure 3A:
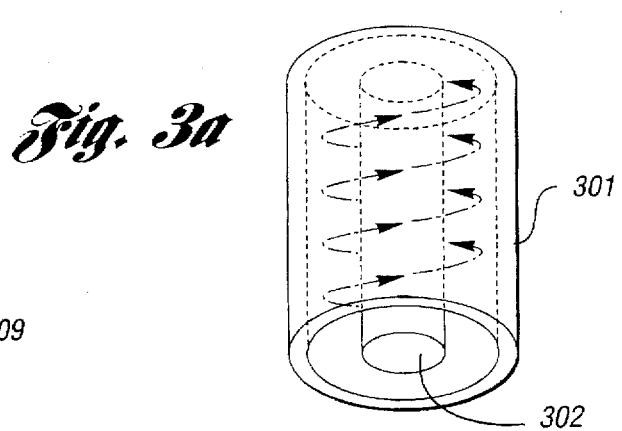
FIG. 3a illustrates ideal vortexing flow through the devices of the subject invention.

In FIG. 3 is shown an alternative device housing 301 having the same type of water outlet as shown in FIG. 2. However, the water inlet is shown as a separate flange device 309 having an internal thread 311 for connection to the water circulation system, and a vaned structure 313 which forces the incoming water into a swirling flow surrounding the central electrode. The same type of central electrode as shown in FIG. 2 may be used with the device of FIG. 3. It is of course possible to machine, weld or otherwise supply the vanes of the device in FIG. 3 into the cylindrical housing itself, thus not requiring a flanged connection at the bottom. The swirling flow through the devices is shown in FIG. 3a. The electrical terminal to connect the cathode to the power supply is 306.

In FIG. 4 is shown a device 400 which is suitable for use with lower pressures, for example those of low pressure commercial systems, or with swimming pools and the like. In the case of FIG. 4, the body 401 of the device is made of injection molded plastic with a tangential angled exit 409 similar to those shown in FIGS. 2 and 3. The anode 403 shown in FIG. 4a is surround-molded with plastic 405 forming an external thread 406 with a shoulder 411 suitable for sealing the top of the device. Exiting the top of the molded plastic portion is the electrical connection 410 for the anode. The water inlet is at 407. At 404 is an internally threaded portion to receive the anode.

The device is shown in cross-section in FIG. 5. At the bottom of the device is an internally threaded connection 507 for the water inlet. From the water inlet, one or a number of channels 508 are arranged in an upward spiral direction to direct the incoming water flow in a tangential swirl in the annular space 505 between the anode 503 and the cylindrical cathode 502. In this case, the cylindrical cathode is inserted into the mold prior to injection molding the housing 501 and thus becomes an integral part of the structure. Electrical connections are made through opening 512 which communicates with anode 503. Connection to the interior located cathode is made through access hole 514 which may be a simple drilled and tapped hole receiving a threaded bolt which contacts cathode 502. Water exits through exit 509.

The construction of the device is further clarified with respect to cross-sections 5a and 5b. For cross-section 5a as shown in FIG. 5a, the exterior consists of an injection molded plastic portion 501 surrounding a stainless steel insert which serves as the cylindrical cathode 502. Upon insertion and sealing of the anode, the anode 503 will be located inside the cylindrical cathode and separated by a concentric space 505 therefrom, forming the flow channel. In 5b is shown a cross-section across 5b–5b in FIG. 5 showing four intake passages 508 connected in spiral fashion to the water inlet 507. As a result of the construction of the water inlet the incoming water swirls around the concentric space between the cathode and the anode, preventing particles from adhering to these electrode surfaces. While the device shown in FIGS. 4 and 5 have been described as an injection molded plastic part, it must be emphasized that many other means of construction are possible. For example, standard pipe fittings can be altered by attachment of a tangential flow directing outlet and both the anode and the vortex creating inlet portions may be constructed to contain standard connections as are common with the use of PVC pipes for example. The cylindrical stainless steel electrode in such cases may be adhesively bonded to the shell, e.g. by potting with epoxy resin, may be shrunk-fit into the shell, or may be secured by other means.

Figure 6:
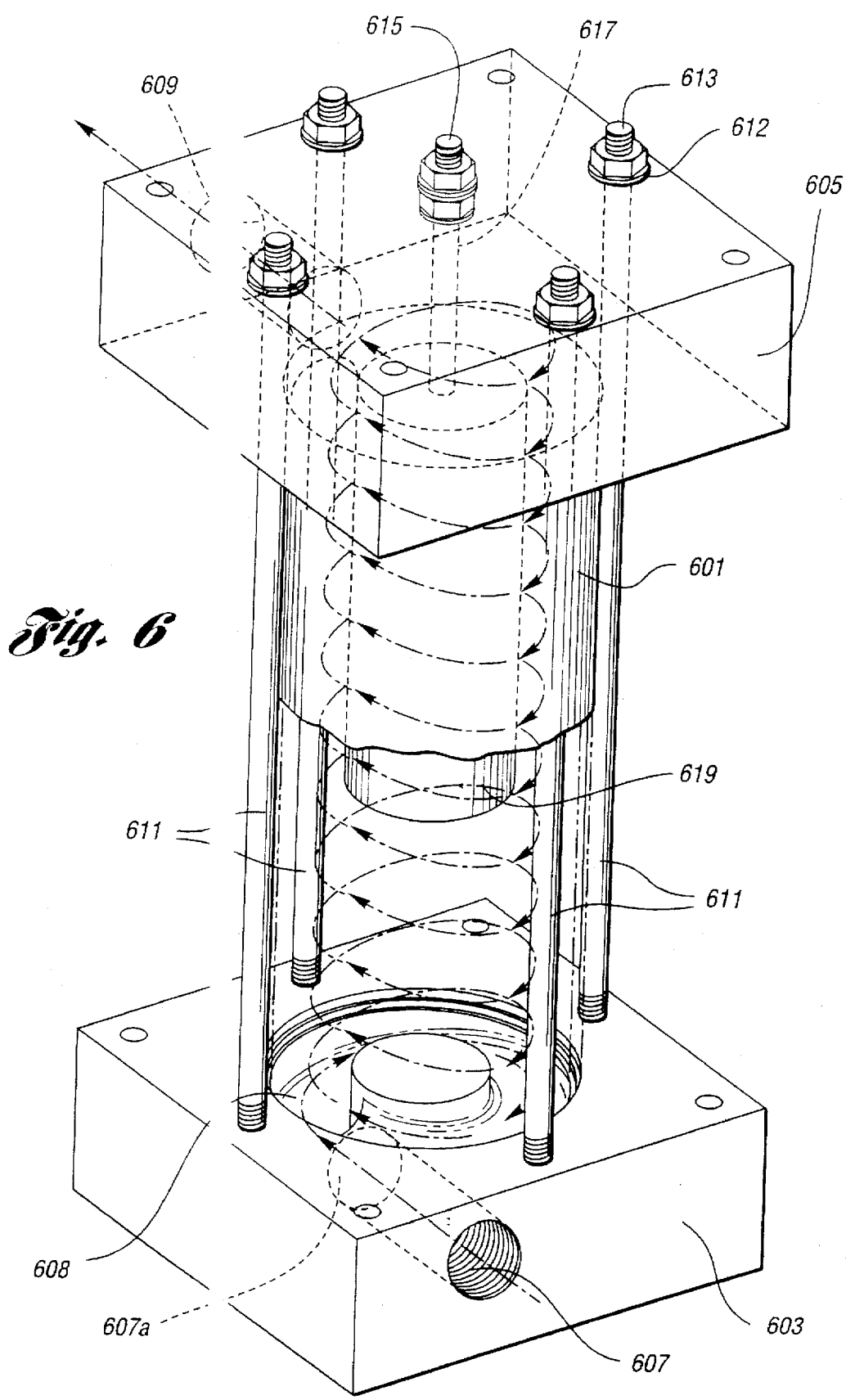
FIG. 6 illustrates a further embodiment of a vortexing electrode device in accordance with the subject invention.

In FIG. 6 is shown a further embodiment of the subject device. Hollow stainless steel cylinder 601 is sealed within endblocks 603 and 605 by elastomeric O-rings (not shown), which may be dispensed when the endblocks are of a hard elastomeric material. The endblocks may be machined plastic or may be injection molded. Water enters the device through inlet 607 and exits through outlet 609, designed to produce a swirling flow of fluid through the device, as shown by the arrows. Both endblocks are preferably identical so as to lower production and inventory costs, although they may be different as well.

From the inlet into the device interior 607a, the surface of endblock follows an upward spiral, or "ramp" 608, which helps induce the vortexing flow through the device. Preferably, the outlet endblock 605 is arranged similarly. Securing studs 611, together with washers 612 and nuts 613 draw the endblocks together and provide the necessary sealing force. At 615 is an electrical terminal attached to stud 617 which threadedly engages a hole in central anode 619.

Many other means of construction are of course possible. It is necessary that the incoming fluid be directed in a vortexing swirl around the central electrode. This swirling effect may be produced by any of the methods previously described or by others, however, it is necessary that the flow not be laminar. Additional vanes or other devices may be included within the structure to facilitate maintaining the swirling flow of fluid. If the swirling flow of fluid is not maintained, more rapid occlusion of the electrode surfaces may occur and uniform wear of the electrodes compromised.

The subject devices exhibit much more uniform anode decay than other devices where electrode geometry is irregular and a swirling flow of fluid is not provided for. The result is longer and more predictable electrode life as well as much less occlusion of electrode surfaces which otherwise would require more frequent cleaning and/or reversal of electrode polarity. However, certain embodiments of he subject invention offer the opportunity for further improvements with regard to economical and essentially maintenance free operation.

Having now fully described the invention, it will be apparent to one of ordinary skill in the art that many changes and modifications can be made thereto without departing from the spirit or scope of the invention as set forth herein.

What is claimed is:

1. In an ionization delivery unit suitable for generating metal cations in an aqueous fluid flowing therethrough by ionization of one or more electrodes biased by an ionization producing voltage, the improvement comprising an anode of substantially cylindrical exterior, said anode comprised of a metal or metal alloy capable of Generating one or more microbicidal metal ions;

a cathode comprised of a metal or metal alloy which may be the same or different from the metal or metal alloy of the anode said cathode comprising a cylinder which substantially surrounds said anode;

a generally elongate housing containing said anode and said cathode disposed such that a flow path is established between said anode and said cathode, said flow path being generally hollow-cylindrical in shape;

an inlet directing said fluid flowing through said unit into said flow path such that to said fluid is imparted a substantial circumferentially tangential component such that a vortexing flow through said flow path is established; and an outlet for said fluid.

2. The unit of claim 2 wherein said anode comprises a copper/silver alloy.

3. The unit of claim 1 wherein said cathode comprises stainless steel.

4. The unit of claim 1 wherein said inlet comprises a substantially cylindrical passageway communicating with said flow path in a direction aligned with a plane tangential to a diameter of said housing and parallel to the axis thereof.

5. The unit of claim 4 wherein said direction aligned is such that fluid entering said unit is directed at an angle greater than 90° to the direction of fluid flow through the device.

6. The unit of claim 4 wherein said inlet is disposed on an inlet end of said elongate housing, said inlet end substantially orthogonal to the longitudinal axis of said housing.

7. The unit of claim 6 wherein said inlet or said inlet end comprises one or more series of vanes such that to said fluid is imparted a tangential flow component.

8. The unit of claim 6 wherein said inlet end contains one or more internal inlet passages directed tangential to a diameter of said housing and upward toward said flow path.

9. The unit of claim 8 wherein said internal inlet passage (s) comprise an upward and outward spiral.

10. The unit of claim 1 wherein said housing and said cathode comprise an integral housing/cathode manufacture comprised of stainless steel.

11. The unit of claim 1 wherein said housing comprises an organic polymer manufacture containing a stainless steel cylindrical cathode.

12. The unit of claim 11 wherein said housing is injection molded around said stainless steel cylinder.

13. In a process for the purification of aqueous systems by means of an ionization delivery unit which supplies one or more microbicidal metal ions from one or more electrodes biased by an ionization inducing voltage, to a fluid flowing through said unit, the improvement comprising:

selecting as an anode an elongate anode having a substantially cylindrical exterior, said anode comprised of a metal or metal alloy capable of generating one or more microbicidal metal ions;

selecting as a cathode an elongate cathode comprised of a metal or metal alloy which may be the same or different from the metal or metal alloy of the anode, said cathode comprising a hollow cylinder which substantially surrounds said anode;

positioning said anode and said cathode such that a flow path in the form of a hollow cylinder is established between said anode and said cathode;

directing fluid flowing through an inlet into said unit into said flow path such that to said fluid is imparted a substantial circumferentially tangential component such that a vortexing flow through said flow path is established; and providing an outlet for said fluid, wherein occlusion of one or more electrodes is diminished by said tangential flow of said fluid.

14. The process of claim 13 wherein said step of directing comprises selecting as an inlet a substantially cylindrical passageway communicating with said flow path in a direction aligned with a plane tangential to a diameter of said housing and parallel to the axis thereof.

15. The process of claim 14 wherein said step of directing comprises selecting as an inlet a substantially cylindrical passageway communicating with said flow path in a direction aligned with a plane tangential to a diameter of said housing and parallel to the axis thereof, such that fluid entering said unit is directed into said flow path at an angle greater than 90° to the direction of fluid flow through the device.

16. The process of claim 13 wherein said step of directing comprises selecting an inlet disposed on an inlet end of said elongate housing.

17. The process of claim 13 wherein said step of directing comprises selecting an inlet wherein said inlet end contains one or more internal inlet passages directed tangential to a diameter of said housing and upward toward said flow path.

18. A method of decreasing electrode wear and occlusion in an ionization delivery unit suitable for introducing microbicidal metal ions from at least one electrode into an aqueous fluid flowing therethrough, said method comprising:

disposing a cylindrical inner electrode within a hollow cylindrical outer electrode such that a generally hollow-cylindrical flow path is established therebetween; and directing said aqueous fluid into an inlet of said unit in communication with said flow path such that a vortexing flow is initiated within said flow path.

19. The method of claim 18 wherein said inner electrode is an anode comprising a copper/silver alloy and said outer electrode is a cathode comprising stainless steel.

* * * * *